(12) United States Patent
Tsubouchi et al.

(10) Patent No.: US 7,104,059 B2
(45) Date of Patent: Sep. 12, 2006

(54) MASTER CYLINDER

(75) Inventors: Kaoru Tsubouchi, Kariya (JP); Katsuhiro Mita, Kariya (JP); Koji Suzuki, Kariya (JP)

(73) Assignee: Advics Co., Ltd., Aichi (JP)

( * ) Notice: Subject to any disclaimer, the term of this patent is extended or adjusted under 35 U.S.C. 154(b) by 52 days.

(21) Appl. No.: 10/997,914

(22) Filed: Nov. 29, 2004

(65) Prior Publication Data

US 2005/0115237 A1 Jun. 2, 2005

(30) Foreign Application Priority Data

Dec. 1, 2003 (JP) .............................. 2003-401997
Aug. 23, 2004 (JP) .............................. 2004-241962

(51) Int. Cl.
*B60T 11/20* (2006.01)

(52) U.S. Cl. .............................. 60/562; 60/588; 60/589

(58) Field of Classification Search .................. 60/552, 60/562, 585, 588, 589; 92/171.1, 169.1
See application file for complete search history.

(56) References Cited

U.S. PATENT DOCUMENTS

| | | | |
|---|---|---|---|
| 4,249,381 A | | 2/1981 | Gaiser |
| 4,414,811 A | * | 11/1983 | Gaiser .......................... 60/589 |
| 4,527,395 A | * | 7/1985 | Gaiser et al. .................. 60/562 |
| 5,878,575 A | * | 3/1999 | Kreh et al. ..................... 60/562 |
| 6,272,858 B1 | * | 8/2001 | Takano et al. ................. 60/588 |
| 6,978,614 B1 | * | 12/2005 | Bourlon et al. ............... 60/588 |
| 2004/0079078 A1 | | 4/2004 | Bacardit et al. |

FOREIGN PATENT DOCUMENTS

| | | |
|---|---|---|
| JP | 2000-071969 | 3/2000 |
| WO | WO02/064410 A1 | 8/2002 |

* cited by examiner

*Primary Examiner*—Igor Kershteyn
(74) *Attorney, Agent, or Firm*—Buchanan Ingersoll PC (57) ABSTRACT

A master cylinder includes a primary cup received in a groove formed in the inner wall of the cylinder body. Projections are formed on a radially inner portion of the cup so as to protrude forwardly from the front end of the radially inner portion. The projections are adapted to be pressed against the front end wall of the cup-receiving groove and elastically deformed under a pressure difference produced between the front and rear ends of the cup when the piston is returned quickly, allowing the cup to advance in the cup-receiving groove. When the cup advances in the groove, a fluid passage is defined between a base portion of the cup and the rear end wall of the groove. Brake fluid from the reservoir flows through this fluid passage, through a gap formed between a radially outer portion of the cup and the radially outer wall of the groove when the radially outer portion of the cup is deformed by the fluid flow, and through a fluid passage defined between the cup and the front end wall of the groove by the projections.

12 Claims, 5 Drawing Sheets

MASTER CYLINDER

BACKGROUND OF THE INVENTION

This invention relates to a master cylinder used in a vehicle hydraulic brake system, and particularly a master cylinder of the type including a cup received in a groove formed in the inner wall of a cylinder body and a piston for pressurizing brake fluid in a pressure chamber, the piston being in sliding contact with the radially inner periphery of the cup. This type of master cylinder is hereinafter sometimes referred to as a piston-to-cup slide type master cylinder.

Such piston-to-cup slide type master cylinders are disclosed in the following three patent publications: WO-02/064410 (Publication 1), JP patent publication 2000-71969 (Publication 2), and U.S. Pat. No. 4,249,381 (Publication 3).

The master cylinder disclosed in Publication 1 includes a primary cup received in a groove formed in the inner wall of the cylinder body for sealing the outer periphery of the piston. The primary cup includes a thick base portion having a lip extending forwardly from the base portion so as to be in sliding contact with the piston. The lip is adapted to be deformed under a pressure difference produced between the front and rear ends of the primary cup when the piston is returned quickly, thereby defining a fluid passage between the inner periphery of the primary cup and the piston. Through this fluid passage, brake fluid can flow forward.

The master cylinder disclosed in Publication 2 includes a spacer and a guide provided rearwardly of the primary cup. A fluid passage leading to the reservoir is formed between the spacer and the guide. The piston is formed with piston ports corresponding to this fluid passage.

The master cylinder disclosed in Publication 3 has a primary cup formed with grooves in its back surface. Brake fluid is supplied into the cylinder pressure chamber through these grooves, grooves formed in the piston at its tip, and a supply port.

One disadvantage of the master cylinder of Publication 1 is that the lip of the primary cup, which extends forwardly from its base portion, is low in strength.

In a hydraulic brake system including an electronic control unit which can perform automatic brake control such as vehicle stability control, the piston of the master cylinder may be pushed backward under the pressure of brake fluid flowing backward from the brake circuit provided between the wheels and the master cylinder. The lip of the primary cup has to have a sufficient strength so that it can withstand this pressure. Thus, the master cylinder disclosed in Publication 1 includes a reinforcing member such as a reinforcing ring for reinforcing the lip of the primary cup such that the lip can withstand the backflow pressure.

In some brake systems including an electronic control unit for controlling brake hydraulic pressure, brake fluid is sucked from the reservoir into the brake circuit through the master cylinder pressure chamber while the master cylinder is in its inoperative state. For this purpose, as disclosed in Publication 2, it is necessary to provide the piston with piston ports rearwardly of the primary cup so that the pressure chamber communicates with the reservoir through the piston ports while the master cylinder is in its inoperative state.

The sealing arrangement of the master cylinder disclosed in Publication 1, which practically comprises only the lip of the primary cup, is simpler in structure than that of the master cylinder disclosed in Publication 2, which comprises, besides the primary cup, the spacer and the guide. But in the arrangement of Publication 1, which needs the reinforcing member for reinforcing the lip, and in which the piston ports are provided rearwardly of the primary cup, the travel distance of the piston from its initial position to its advanced position where the piston ports are closed by the primary cup tends to be long. This deteriorates the driver's brake pedal feel.

The master cylinder disclosed in Publication 2 enjoys a shorter travel distance of the piston until the piston ports are closed. But in this arrangement, it is necessary that the cylinder body be assembled from a plurality of separate members in order to mount the spacer and the guide. This of course complicates the structure, increases the number of assembling steps and pushes up the cost. In Publication 3, the grooves formed in the back of the cup communicate with the pressure chamber not through the piston ports but through the axial grooves formed in piston at its tip. This arrangement also complicates the structure of the master cylinder.

An object of the invention is to provide a master cylinder which is simple in structure, which allows smooth suction of brake fluid from the reservoir into the pressure chamber through the primary cup when the piston is returned quickly, which allows smooth suction of brake fluid from the reservoir into the pressure chamber through the piston ports while the master cylinder is in its inoperative state, and which enjoys a shorter travel distance of the piston until the piston ports are closed.

SUMMARY OF THE INVENTION

According to the present invention, there is provided a master cylinder comprising a cylinder body, a primary cup received in a groove defined in an inner periphery of the cylinder body by a front end wall, a rear end wall and a radially outer wall connecting the inner and outer walls together, a piston received in the cylinder body so as to be slidably guided by the primary cup, the cylinder body having a pressure chamber in which is stored a brake fluid adapted to be pressurized by the piston when the piston advances, the primary cup comprising a radially inner portion having a front end and kept in sliding contact with the piston, a radially outer portion having a front end and kept in sliding contact with the radially outer wall of the groove, and a base portion connecting the radially inner and outer portions together, the radially inner portion having at least one projection that protrudes forwardly from the front end of the radially inner portion to define a first fluid passage between the primary cup and the front end wall of the groove when the projection is in contact with the front end wall of the groove, whereby brake fluid from a reservoir can flow into the pressure chamber through a gap between a rear surface of the base portion of the primary cup and the rear end wall of the groove, through a gap formed between the radially outer portion of the primary cup and the radially outer wall of the groove, and through the first fluid passage.

In one specific arrangement, the primary cup is axially forwardly movable under a pressure difference between front and rear ends of the primary cup and is structured such that when the primary cup has axially forwardly moved under the pressure difference, the rear surface of the base portion separates from the rear end wall of the groove, thereby defining a second fluid passage therebetween, the at least one projection comes into contact with the front end wall of the groove, thereby defining the first fluid passage between the front ends of the radially inner and outer portions of the primary cup and the front end wall of the groove, and the radially outer portion is deformed under the pressure difference, thereby defining a third fluid passage between the radially outer portion of the primary cup and the radially outer wall of the groove, with the first and second fluid passages communicating with each other through the third fluid passage.

The projection may be adapted to be elastically deformed when pressed against the front end wall of the groove, and the second fluid passage may be adapted to be defined between the rear surface of the base portion of the primary cup and the rear end wall of the groove when the projection is elastically deformed by being pressed against the front end wall of the groove.

In still another specific arrangement, there are provided a plurality of the projections that are circumferentially spaced from each other, and the primary cup is structured such that its portions present between the plurality of projections as viewed from an axial direction of the primary cup are deformed toward the front end wall of the groove under a pressure difference between front and rear ends of the primary cup, thereby defining a second fluid passage between a rear surface of the base portion of the primary cup and the rear end wall of the groove.

According to the present invention, when the piston is returned quickly, the primary cup advances in the groove or the base portion of the primary cup is deformed to define a fluid passage, and radially outer portion of the primary cup is deformed to define another passage. Thus, brake fluid can smoothly flow into the pressure chamber through these fluid passages. Thus, the travel distance of the piston until the piston ports are closed can be determined by the radially inner portion of the primary cup. There is no need to provide a lip that extends forwardly from the base portion of the primary cup as disclosed in Publication 1, and thus no need for a reinforcing member for such a lip. This allows shortening of the travel distance of the piston until the piston ports are closed and thus improves the driver's brake pedal feel.

The fluid passage defined by the projection or projections formed on the radially inner portion of the primary cup ensures further smooth suction of brake fluid into the pressure chamber when the piston is returned quickly.

These fluid passages are defined only by the primary cup and no additional elements are necessary. Thus, the master cylinder of the present invention is simple in structure and is made up of a minimum number of parts.

After the primary cup has advanced or elastically deformed in the groove under a pressure difference between the front and rear ends of the primary cup, it returns to the original position or original shape as soon as the pressure difference disappears. Thus, the travel distance of the piston until the piston ports are closed is always kept at a minimum level.

The projection may be provided on a radially outer surface of the radially inner portion of the primary cup so as to be located radially outwardly of the radially inner portion of the primary cup. Such a projection prevents the radially inner portion and the radially outer portion of the primary cup from sticking to each other. Also, because such a projection is located radially outwardly of the radially inner, front edge of the radially inner portion, which is cut after forming the primary cup, such a projection will not interfere with the cutting of this edge, so that the projection can be formed simultaneously when forming the primary cup. This improves productivity of the primary cup.

The radially outer portion of the primary cup may have a lower rigidity than the radially inner portion of the primary cup.

The base portion of the primary cup may be formed with protrusions on the rear surface thereof, the protrusions being in contact with the rear end wall of the groove, thereby defining a second fluid passage between the rear surface of the base portion and the rear end wall of the groove. With this arrangement, because the second fluid passage is always present, brake fluid can flow through the gap around the primary cup only by deforming the radially outer portion of the cup without the need to deform its base portion and its projection or projections. Brake fluid can thus more smoothly flow into the pressure chamber when the brake pedal is released, allowing a quicker return of the piston.

In yet another specific arrangement, there are provided a plurality of the projections, each of the protrusions being disposed between and substantially circumferentially equally distanced from a circumferentially adjacent pair of the projections as viewed from an axial direction of the primary cup.

The protrusions may be radial ribs.

The projection may have its tip in contact with the front end wall of the groove, with the protrusions in contact with the rear end wall of the groove.

Instead of the protrusions, the base portion may have at least one groove formed in its rear surface through which the reservoir is adapted to communicate with the first fluid passage.

The piston may be formed with a piston port through which the reservoir is adapted to communicate with the pressure chamber, the piston ports being adapted to be closed by the primary cup when the piston advances until rear ends of the piston ports align with a rear end of the radially inner portion of the primary cup, thereby closing communication between the pressure chamber and the reservoir, whereby the brake fluid pressure in the pressure chamber begins to rise when the piston advances after the piston ports have been closed.

Without the fluid passage defined between the rear surface of primary cup and the rear end wall of the cup-receiving groove by the protrusions or the groove or grooves formed on the rear surface of the cup, a closed space may develop in the cup-receiving space at its radially outer corner, and brake fluid sealed therein may impede stable seating of the primary cup. Also, a negative pressure produced in the pressure chamber may cause a portion of the primary cup to get stuck on the wall of the cup-receiving groove. The fluid passage defined by the protrusions or the grooves formed on the rear surface of the cup prevents formation of such a closed space.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
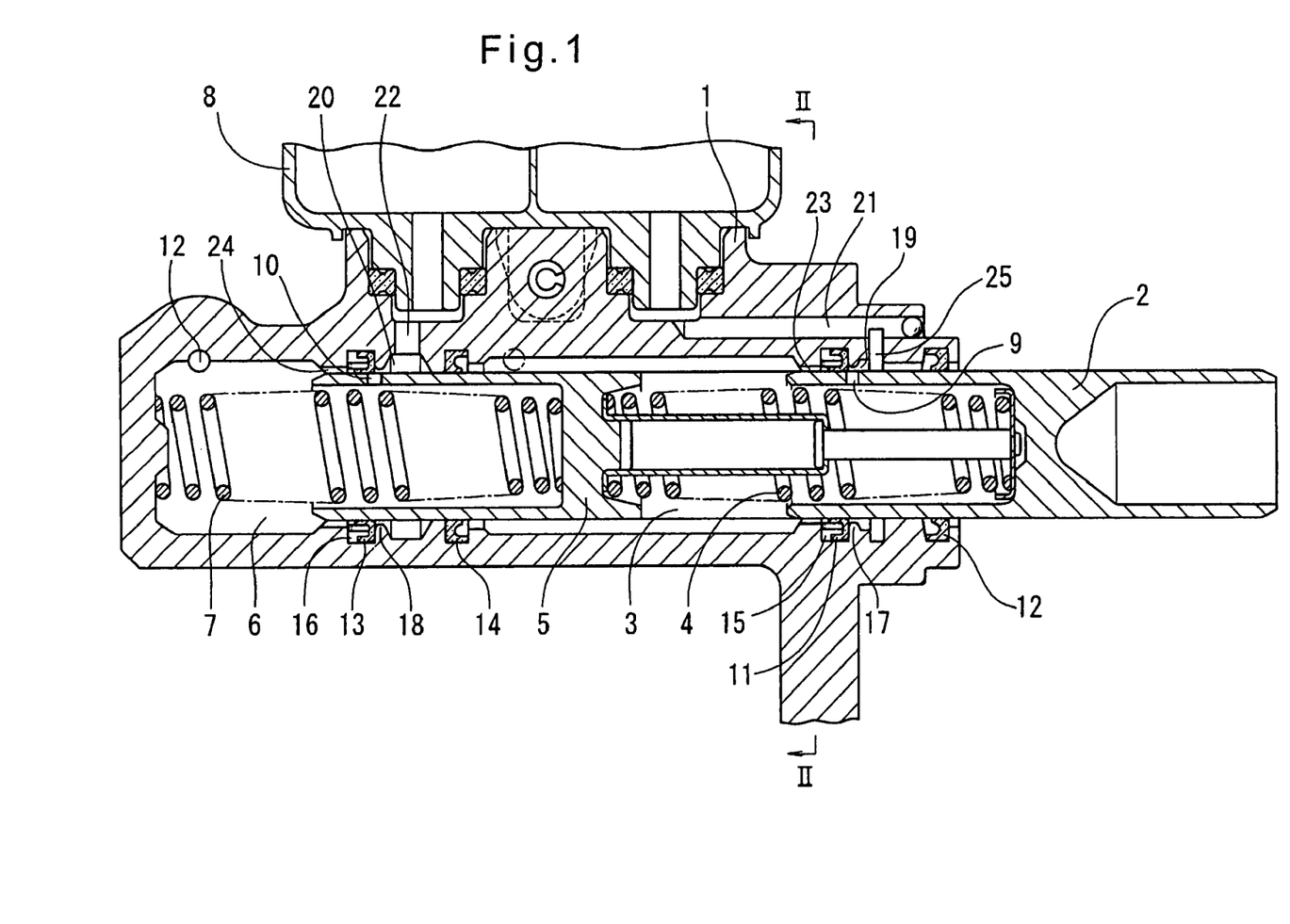
FIG. 1 is a sectional view of a master cylinder embodying the present invention.

Now referring to the drawings, FIG. 1 shows the entire master cylinder embodying the present invention. It comprises a cylinder body 1, a primary piston 2 slidably received in the cylinder body 1, a secondary piston 5 slidably received in the cylinder body 1 in front (leftwardly in FIG. 1) of the primary piston 2. A first pressure chamber 3 is defined in the cylinder body 1 between the primary and secondary pistons 2 and 5. A second pressure chamber 6 is defined in the cylinder body 1 between the secondary piston 5 and the front (left-hand) end wall of the cylinder body. The primary piston 2 pressurizes brake fluid in the first pressure chamber 3 to generate brake hydraulic pressure therein. The secondary piston 5 pressurizes brake fluid in the second pressure chamber 6 to generate brake hydraulic pressure therein. Return springs 4 and 7 for the primary and secondary pistons 2 and 5 are mounted in the first and second pressure chambers 3 and 6, respectively.

The primary piston 2 and the secondary piston 5 are formed with piston ports 9 and 10, respectively, through which the first and second pressure chambers 3 and 6 are adapted to communicate with a reservoir 8 while the master cylinder is in its inoperative state (i.e. while the pistons 2 and 5 are in their respective original positions).

Primary cups 11 and 13, a secondary cup 12 and a pressure cup 14 are received in respective grooves formed in the inner wall of the cylinder body 1. The primary cup 11 seals the gap between the primary piston 2 and the inner wall of the cylinder body 1. The secondary cup 12 isolates the interior of the cylinder body 1 from the atmosphere. The primary cup 13 seals the gap between the secondary piston 5 and the inner wall of the cylinder body 1. The pressure cup 14 isolates the first pressure chamber 3 from the reservoir 8. The grooves in which the primary cups 11 and 13 are received are designated by the numerals 15 and 16, respectively.

On the inner wall of the cylinder body 1, annular walls 17 and 18 are integrally formed rearwardly (to the right in FIG. 1) of the respective primary cups 11 and 13 to individually support the primary cups 11 and 13.

The annular walls 17 and 18 have an inner diameter slightly greater than the outer diameter of the primary and secondary pistons 2 and 5 so that small clearances are present between the walls 17 and 18 and the pistons 2 and 5.

Rearwardly of the respective annular walls 17 and 18, annular passages 19 and 20 are formed which communicate with the reservoir 8 through passages 21, 22 and 25 formed in the cylinder body 1.

Figure 2:
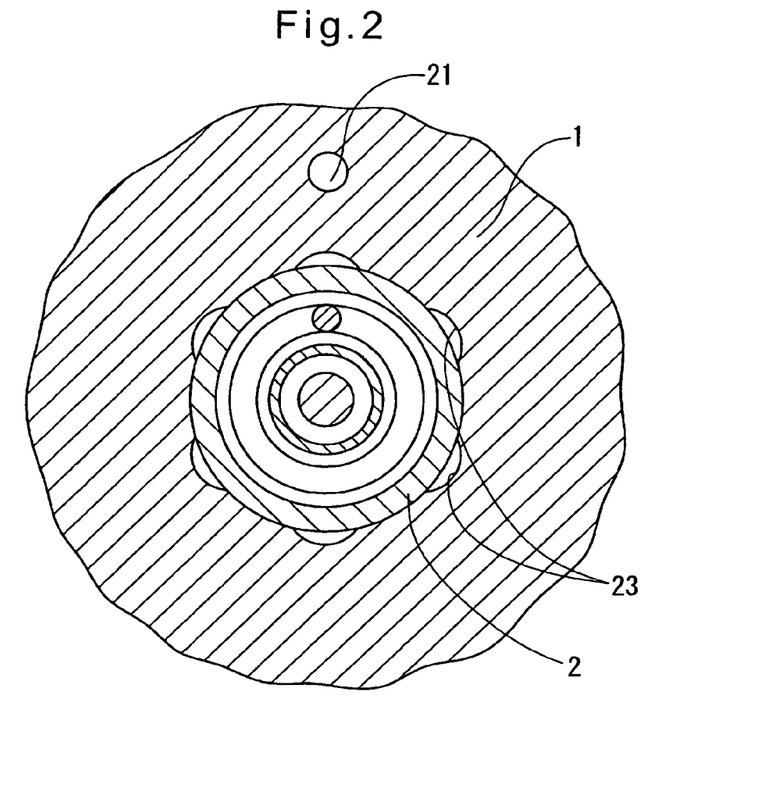
FIG. 2 is an enlarged sectional view taken along line II—II of FIG. 1.
Figure 3:
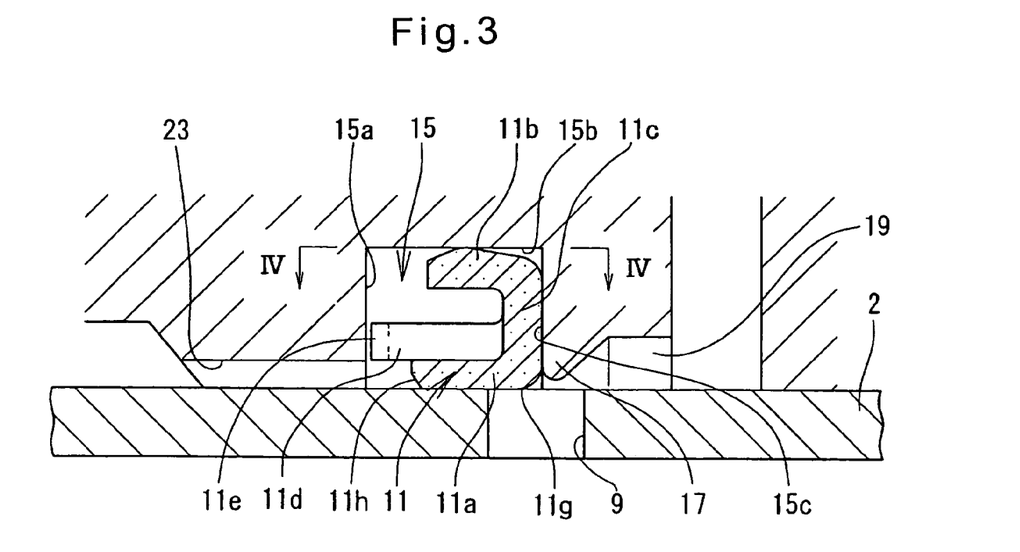
FIG. 3 is an enlarged sectional view of the master cylinder of FIG. 1, showing a portion where the primary cup is provided.

On the inner wall of the cylinder body 1, slide guide portions for guiding the primary piston 2 and the secondary piston 5 are provided in front of the primary cups 11 and 13, respectively. As best shown in FIGS. 2 and 3, in the inner surfaces of the respective slide guide portions, a plurality of axial grooves 23 and 24 having an arcuate cross-section are formed through which brake fluid flows from the reservoir 8 into the first and second pressure chambers 3 and 6 when the pistons 2 and 5 are returned quickly.

The primary cup 11, groove 15, annular wall 17, grooves 23 and any other element associated with the primary piston 2 are substantially identical in structure, shape and function to the primary cup 13, groove 16, annular wall 18, grooves 24 and any other element associated with the secondary piston 5. Therefore, from here, description is made only of the elements associated with the primary piston 2.

As shown in FIG. 3, the primary cup 11 comprises a radially inner annular portion 11*a*, a radially outer annular portion 11*b*, and a base portion 11*c* connecting the rear ends of the portions 11*a* and 11*b* together. The radially inner portion 11*a* has a plurality of circumferentially spaced apart projections 11*d* and a plurality of circumferentially spaced apart projections 11*e*.

Figure 4:
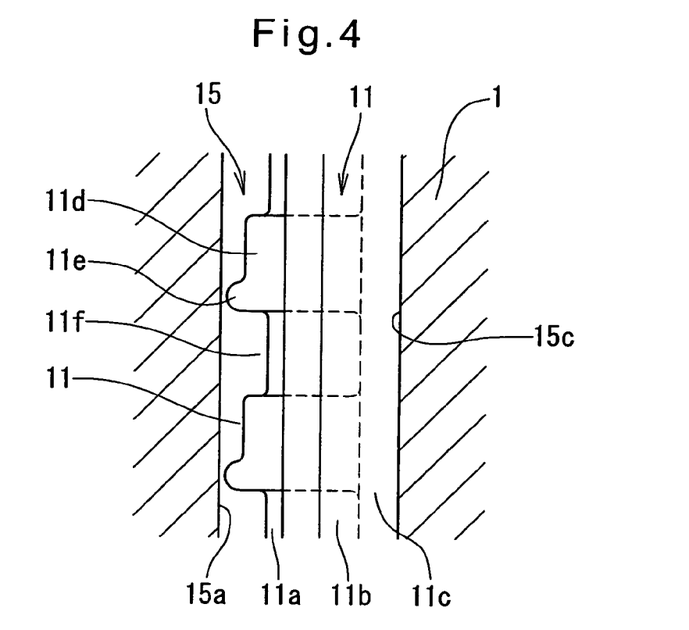
FIG. 4 is a sectional view taken along line IV—IV of FIG. 3.

The projections 11*d* are larger and higher in rigidity than the projections 11*e*. As seen in FIG. 4, flow passages 11*f* are defined between the adjacent projections 11*d*.

The projections 11*d* protrude forwardly from the front end of the radially inner portion 11*a* of the cup 11. The projections 11*e* protrude further fowardly from the front ends of the projections 11*d*.

When the piston 2 is in its initial position, the base portion 11*c* of the cup 11 is pressed against the rear end wall 15*c* of the groove 15 with the projections 11*e* in abutment with the front end wall 15*a* of the groove 15.

The radially outer portion 11*b* of the primary cup 11 is lower in rigidity than the radially inner portion 11*a* so as to easily deflect under the pressure difference between the front and back of the cup 11 and separate from the circumferential wall 15*b* of the groove 15.

The projections 11*e* and 11*d* are provided radially outwardly of the grooves 23 so as not to close the rear openings of the grooves 23.

As shown in FIGS. 3 and 4, the projections 11*d* and 11*e* protrude radially outwardly from the radially inner portion 11*a*, and thus serve as spacers that prevent the radially inner and outer portions 11*a* and 11*b* from getting stuck together. The projections 11*d* also serve as reinforcing ribs for the radially inner portion 11*a*.

When the primary piston 2 begins to advance from its initial position and the rear ends of its piston ports 9 align with the rear end 11*g* of the radialy inner portion 11*a* of the primary cup 11, the piston ports 9 are completely closed by the cup 11, so that the first pressure chamber 3 is isolated from the reservoir 8. Thereafter, brake fluid in the first pressure chamber 3 is pressurized and the pressure begins to rise. Until the piston ports 9 close, the piston 2 will advance without encountering any major resistance because the pressure chamber 3 still communicates with the reservoir 8.

The projections 11*d* and 11*e* may be provided on the front end of the radially inner portion 11*a* of the primary cup 11, provided their positions and numbers are determined such that they do not close the rear openings of all of the grooves 23.

The radially inner portion 11*a* has an obliquely cut surface 11*h* along its radially inner, front edge. The cut surface 11*h* is formed after forming the primary cup 11 by molding. The projections 11*d* and 11*e* are formed simultaneously when forming the primary cup 11 for high productivity. The projections 11*d* and 11*e* are formed radially outwardly of the radially inner, front edge of the radially inner portion 11*a* so as not to interfere with the cut surface 11*h*.

In operation, when the primary piston 2 advances, it will move the secondary piston 5 forward, so that the piston ports 10 are closed by the primary cup 13. When the secondary piston 5 is further pushed forward under the hydraulic pressure in the first pressure chamber 3, hydraulic pressure corresponding to the hydraulic pressure in the first pressure chamber 3 is generated in the second pressure chamber 6.

Description is now made about how the elements of the master cylinder operate when the pistons return quickly. Since the elements related to the second pressure chamber 6 (and the secondary piston 5) operate substantially identically to the elements related to the first pressure chamber 3 (and the primary piston 2) when fluid is sucked into the first and second pressure chambers while the master cylinder is in its inoperative state, the following description is made only about the elements related to the first pressure chamber 3. When the pistons are returned quickly, fluid may not flow sufficiently smoothly into the first pressure chamber 3, thus producing a negative pressure in the first pressure chamber 3. The pressure difference between the negative pressure in the chamber 3 and the pressure in the reservoir 8 (which is the atmospheric pressure) acts on the primary cup 11 (FIG. 3), causing the primary cup 11 to advance in the groove 15 while elastically deforming the projections 11e by pressing them against the front end wall 15a of the groove 15. When the projections 11e are elastically deformed to a certain extent, the projections 11d will also abut the front end wall 15a of the groove 15. This stops the advancement of the primary cup 11.

In this state, a gap (fluid passage A; not shown) forms between the base portion 11c of the primary cup 11 and the rear end wall 15c of the groove 15. Another gap (fluid passage B; not shown) forms between the radially outer portion lib of the cup 11 and the circumferential wall 15b of the groove 15 because the radially outer portion 11b is also elastically deformed under the pressure difference. Brake fluid thus smoothly flows into the first pressure chamber 3 through the fluid passages A and B, and another passage C between the primary cup 11 and the front end wall 15a of the groove 15, which comprises the fluid passages 11f (FIG. 4) defined between the adjacent projections 11d. The negative pressure in the first pressure chamber 3 thus quickly disappears.

When the negative pressure in the first pressure chamber 3 disappears, the pressure difference that has been acting on the primary cup 11 also disappears, so that the projections 11e will elastically return to their original shapes, thus moving the primary cup 11 to its original position. The radially outer portion 11b also elastically returns to its original shape. That is, the entire cup 11 returns to its original state.

When a brake circuit for performing brake hydraulic pressure control is actuated by an electronic control unit while the master cylinder is in its inoperative state, brake fluid flows from the reservoir 8 into the first pressure chamber 3 through the piston ports 9 and then is supplied into the brake circuit.

Figure 5:
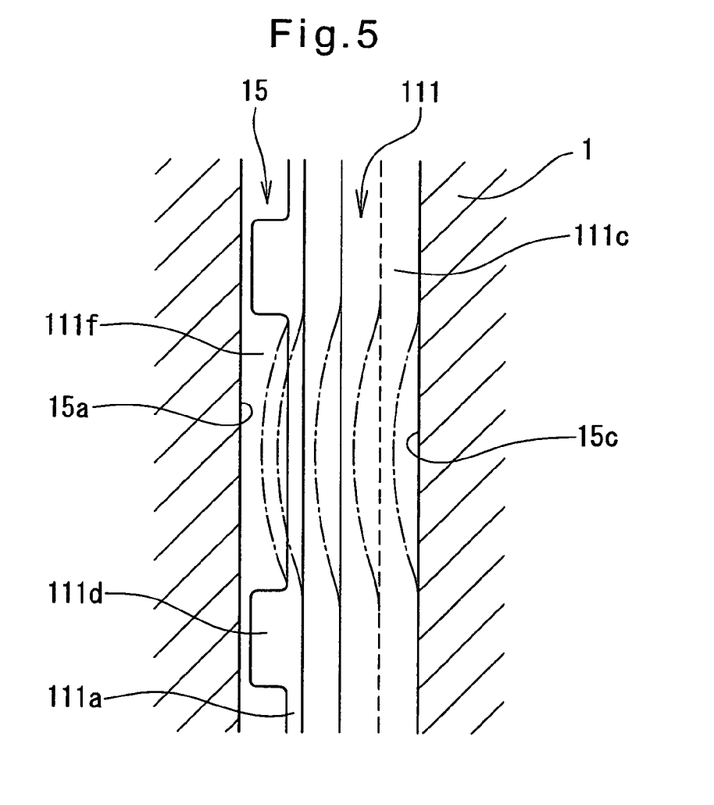
FIG. 5 is a sectional view of a different primary cup.

FIG. 5 shows another embodiment, in which instead of the primary cup 11, a primary cup 111 is received in the groove 15. The primary cup 111 is formed with a small number of projections 111d on the front end thereof that are located adjacent to or substantially abut the front end wall 15a of the groove 15. Fluid passages 111f are defined between the adjacent projections 111d.

Although the primary cup 111 can scarcely advance in the groove 15, under the pressure difference that develops when the pistons return quickly, portions of the base portion 111c of the cup 111 between the adjacent projections 111d are elastically deformed in an arch shape as shown by dotted lines in FIG. 5, thus forming fluid passages between the base portion 111c and the rear end wall 15c of the groove 15. Brake fluid from the reservoir 8 flows through these passages, through the passage formed between the radially outer portion of the cup and the circumferential wall 15b of the groove 15 by elastically deforming the radially outer portion of the cup 111, and through the passages 111f between the adjacent projections 111d into the first pressure chamber 3.

A negative pressure generated in the first pressure chamber 3 thus disappears, and so does the pressure difference acting on the primary cup 111. The primary cup 111 thus elastically returns to its original state.

Figure 6:
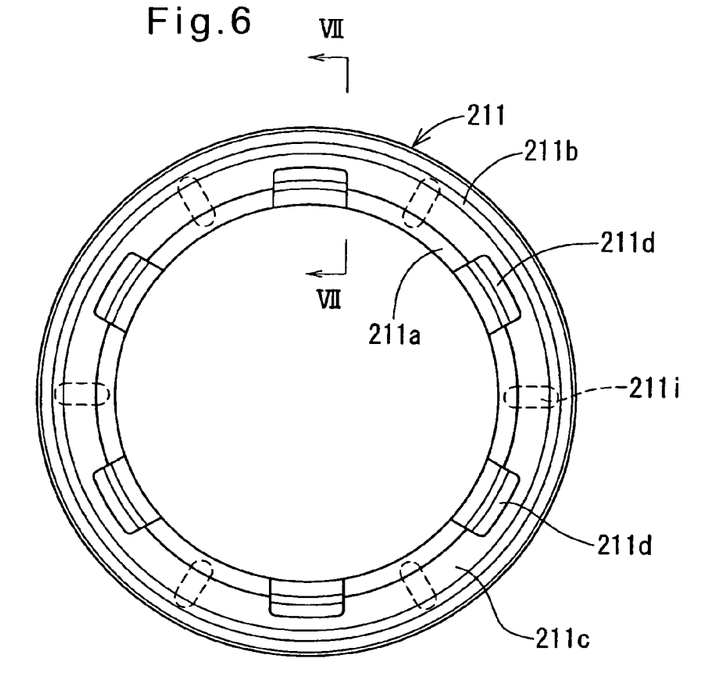
FIG. 6 is a front view of a still different primary cup.
Figures 7A, 7B:
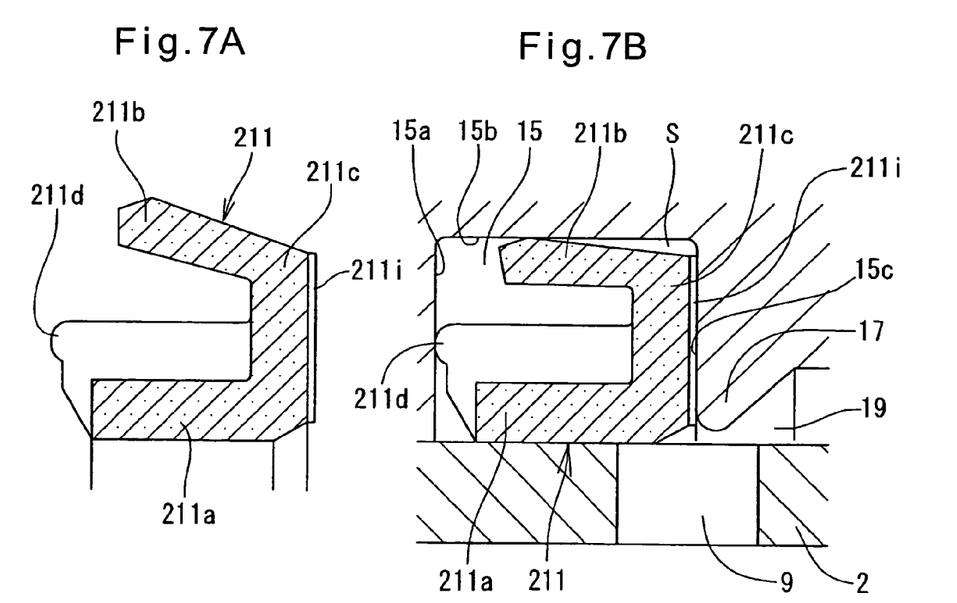
FIG. 7A is an enlarged sectional view taken along line VII—VII of FIG. 6.
FIG. 7B is a sectional view of the primary cup of FIG. 6, as mounted in a cup-receiving groove formed in the cylinder body of the master cylinder shown in FIG. 1.

FIGS. 6, 7A and 7B show another primary cup 211 which is received in the groove 15 instead of the primary cup 11. The primary cup 211 has radial protrusions 211i formed on the rear surface of its base portion 211c. The primary cup 211 further includes projections 211d at the front end of its radially inner portion 211a. As viewed from the axial direction (see FIG. 6), the projections 211d and 211i are disposed circumferentially alternating with each other.

As shown in FIG. 7B, the primary cup 211 has an axial width slightly greater than the groove 15, so that the projections 211d and 211i are both in contact with the respective end walls 15a and 15c of the groove 15. Thus, the rear protrusions 211i define fluid passages extending from the inner periphery to the outer periphery of the cup 211 between the base portion 211c and the rear end wall 15c of the groove 15, while the front projections 211d define fluid passages (not shown) similar to the fluid passages 11f of FIG. 4 between the front end of the radially inner portion 211a and the front end wall 15a of the groove 15. Through the passages defined by the rear protrusions 211i, the gap S present in the groove 15 along its radially outer, rear corner always communicates with the reservoir 8. The protrusions 211i reliably prevent the cup 111 from getting stuck on the rear end wall 15c of the groove 15. Thus, when the brake pedal is released, brake fluid from the reservoir 8 can smoothly flow into the first pressure chamber 3 through the passages defined by the rear protrusions 211i, the gap S, the gap formed between the radially outer portion 211b of the cup 211 and the circumferential wall 15b of the groove 15 when the radially outer portion 211b is elastically deformed, and the passages defined by the projections 211d. This ensures smooth return of the pistons. Also, since the gap S never closes, the cup is seated stably in the groove 15.

As viewed from the axial direction of the primary cup (see FIG. 6), the rear protrusions 211i are preferably equally distanced from the adjacent front projections 211d to prevent the passages defined by the rear protrusions 211i from disappearing and thus to reliably keep the gap S always in communication with the reservoir 8.

The protrusions 211i are preferably radial ribs each continuously extending substantially from the inner periphery to the outer periphery of the cup as shown in FIG. 6. But each such rib may be replaced with a plurality of short ribs or projections. The height of the protrusions 211i determines the depth of the passages defined therebetween, and thus is determined according to the required depth of the passages defined therebetween.

Figure 8:
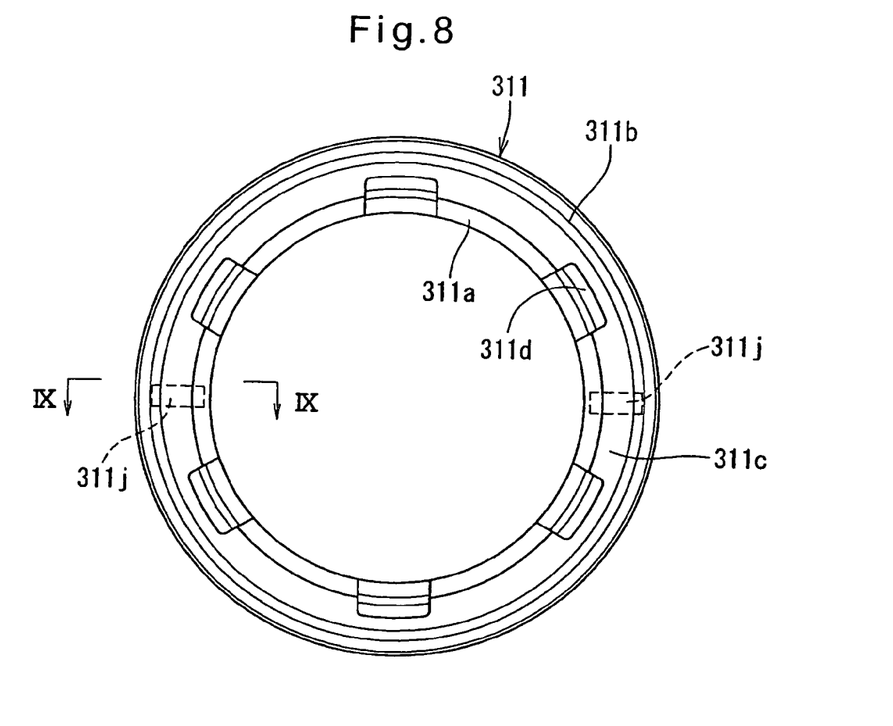
FIG. 8 is a front view of a further different primary cup.
Figure 9:
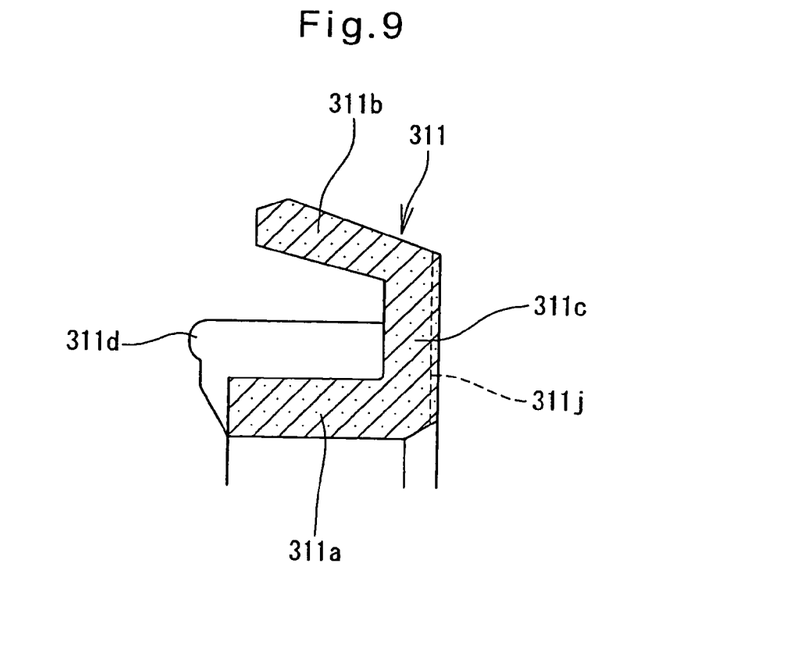
FIG. 9 is an enlarged sectional view taken along line IX—IX of FIG. 8.

FIGS. 8 and 9 show still another primary cup 311 which is received in the groove 15 instead of the primary cup 11. Instead of the protrusions 211i of FIG. 6, radial grooves 311j each extending continuously from the inner periphery to the outer periphery of the cup 311 are formed in the rear end face of its base portion 311c. Otherwise, the primary cup 311 is structurally identical to the primary cup 211 of FIG. 6, though different reference numerals are used (311a for the radially inner portion, 311b for the radially outer portion, 311c for the base portion, and 311d for the projections). In this arrangement, too, the grooves 311j serve to prevent the base portion 311c from getting stuck on the rear end wall 15c of the groove 15, thereby keeping the gap S in the groove 15 always in communication with the reservoir 8, and also serve to keep the cup seated stably by preventing the gap S from being closed. The number of the grooves 311j is not limited as long as they can keep the gap S in communication with the reservoir 8. The grooves 311j preferably have a minimum depth to minimize the deformation of the cup, and thereby to minimize the idle stroke of the piston.

The concept of the present invention is applicable not only to a tandem master cylinder as shown but also to a single-piston master cylinder.

What is claimed is:

1. A master cylinder comprising a cylinder body, a primary cup received in a groove defined in an inner periphery of said cylinder body by a front end wall, a rear end wall and a radially outer wall connecting said front and rear end walls together, a piston received in said cylinder body so as to be slidably guided by said primary cup, said cylinder body having a pressure chamber in which is stored a brake fluid adapted to be pressurized by said piston when said piston advances, said primary cup comprising a radially inner portion having a front end and kept in sliding contact with said piston, a radially outer portion having a front end and kept in sliding contact with said radially outer wall of said groove, and a base portion connecting said radially inner and outer portions together, said radially inner portion having at least one projection that protrudes forwardly from said front end of said radially inner portion to define a first fluid passage between said primary cup and said front end wall of said groove when said projection is in contact with said front end wall of said groove, whereby brake fluid from a reservoir can flow into said pressure chamber through a gap between a rear surface of said base portion of said primary cup and said rear end wall of said groove, through a gap formed between said radially outer portion of said primary cup and said radially outer wall of said groove, and through said first fluid passage.

2. The master cylinder of claim 1 wherein said primary cup is axially forwardly movable under a pressure difference between front and rear ends of said primary cup and is structured such that when said primary cup has axially forwardly moved under said pressure difference, the rear surface of said base portion separates from said rear end wall of said groove, thereby defining a second fluid passage therebetween, said at least one projection comes into contact with said front end wall of said groove, thereby defining said first fluid passage between the front ends of said radially inner and outer portions of said primary piston and said front end wall of said groove, and said radially outer portion is deformed under said pressure difference, thereby defining a third fluid passage between said radially outer portion of said primary cup and said radially outer wall of said groove, with said first and second fluid passages communicating with each other through said third fluid passage.

3. The master cylinder of claim 2 wherein said projection is adapted to be elastically deformed when pressed against said front end wall of said groove, said second fluid passage being adapted to be defined between the rear surface of said base portion of said primary cup and said rear end wall of said groove when said projection is elastically deformed by being pressed against said front end wall of said groove.

4. The master cylinder of claim 1 wherein there are provided a plurality of said projections that are circumferentially spaced from each other, and wherein said primary cup is structured such that its portions present between said plurality of projections as viewed from an axial direction of said primary cup are deformed toward said front end wall of said groove under a pressure difference between front and rear ends of said primary cup, thereby defining a second fluid passage between a rear surface of said base portion of said primary cup and said rear end wall of said groove.

5. The master cylinder of claim 1 wherein said projection is provided on a radially outer surface of said radially inner portion of said primary cup so as to be located radially outwardly of said radially inner portion of said primary cup.

6. The master cylinder of claim 1 wherein said radially outer portion of said primary cup has a lower rigidity than said radially inner portion of said primary cup.

7. The master cylinder of claim 1 wherein said base portion of said primary cup is formed with protrusions on the rear surface thereof, said protrusions being in contact with said rear end wall of said groove, thereby defining a second fluid passage between the rear surface of said base portion and said rear end wall of said groove.

8. The master cylinder of claim 7 wherein there are provided a plurality of said projections, each of said protrusions being disposed between and substantially circumferentially equally distanced from a circumferentially adjacent pair of said projections as viewed from an axial direction of said primary cup.

9. The master cylinder of claim 7 wherein said protrusions are radial ribs.

10. The master cylinder of claim 7 wherein said projection has its tip in contact with said front end wall of said groove, and said protrusions are in contact with said rear end wall of said groove.

11. The master cylinder of claim 1 wherein said base portion has at least one groove formed in its rear surface through which the reservoir is adapted to communicate with said first fluid passage.

12. The master cylinder of claim 1 wherein said piston is formed with a piston port through which the reservoir is adapted to communicate with said pressure chamber, said piston ports being adapted to be closed by said primary cup when said piston advances until rear ends of said piston ports align with a rear end of said radially inner portion of said primary piston, thereby closing communication between said pressure chamber and the reservoir, whereby the brake fluid pressure in said pressure chamber begins to rise when said piston advances after said piston ports have been closed.

* * * * *